(No Model.)  2 Sheets—Sheet 1.
J. R. ANTHONY.
FERTILIZER DISTRIBUTER.
No. 348,507.  Patented Aug. 31, 1886.
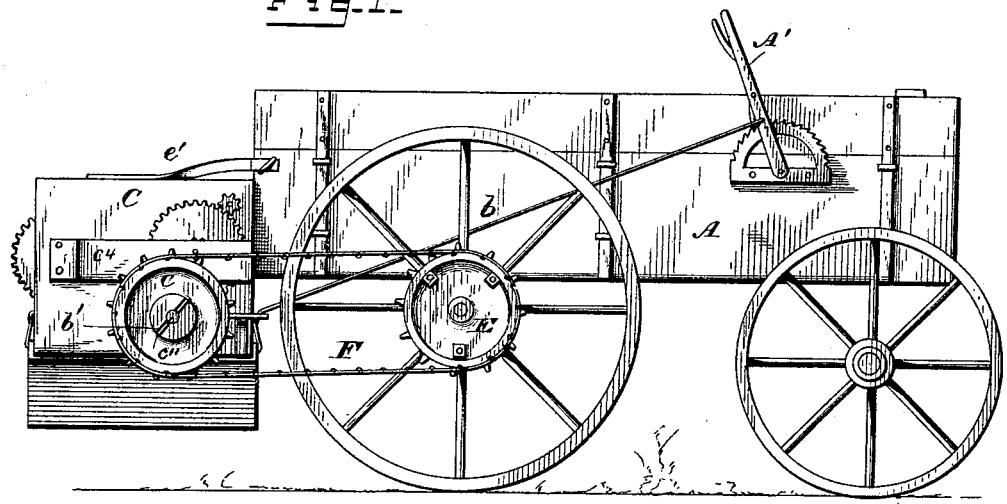
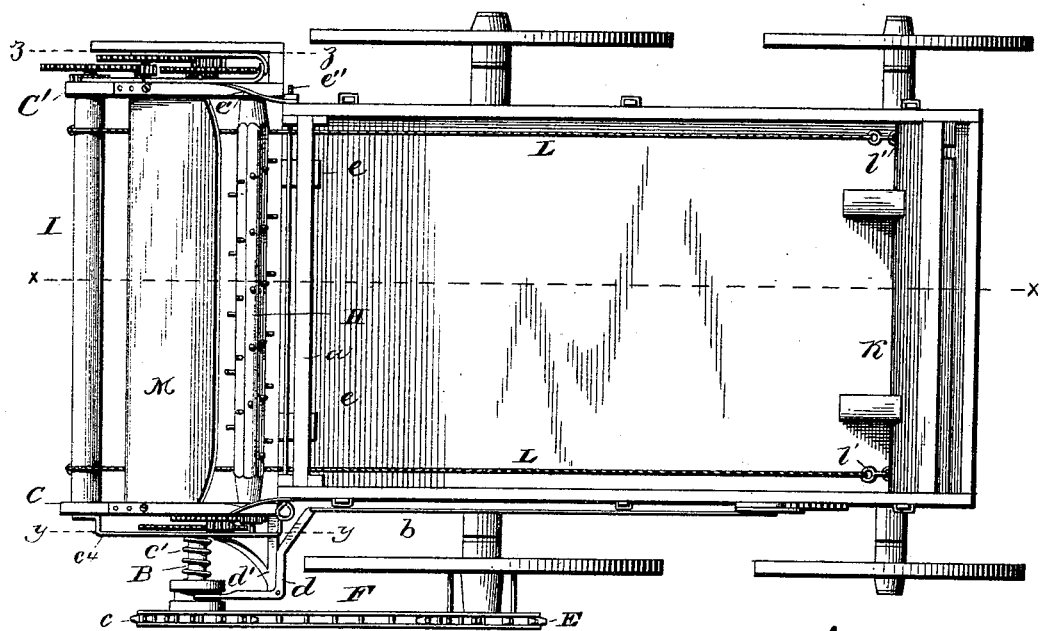
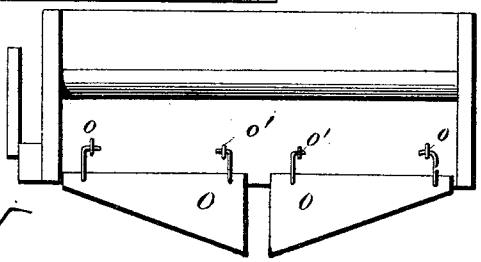
WITNESSES
G. S. Elliott
E. W. Johnson
John R. Anthony
INVENTOR
Attorney (No Model.) 2 Sheets—Sheet 2.
J. R. ANTHONY.
FERTILIZER DISTRIBUTER.
No. 348,507. Patented Aug. 31, 1886.
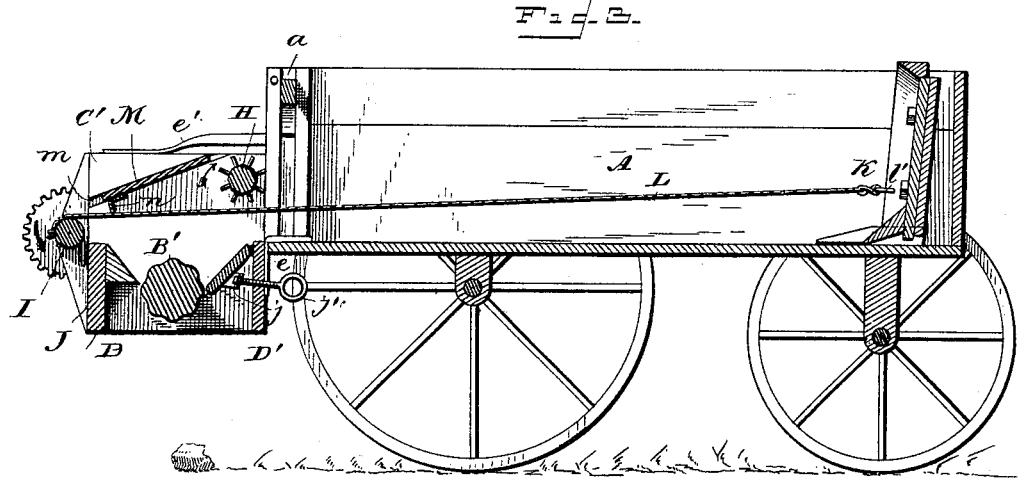
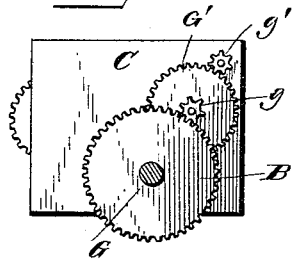
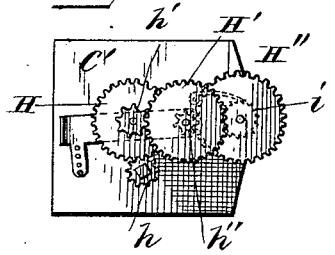
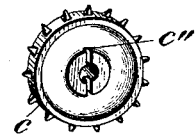
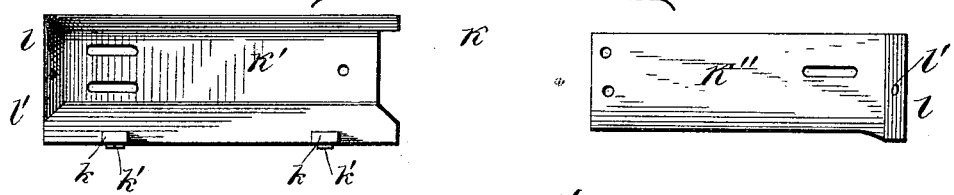
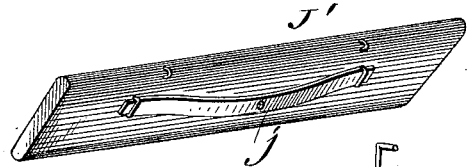
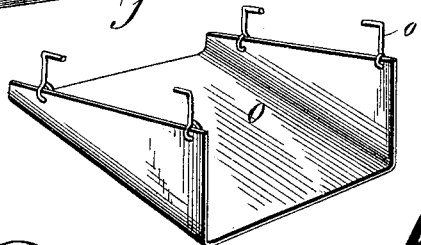
WITNESSES
G. S. Elliott
E. W. Johnson
John R. Anthony
INVENTOR
Attorney

UNITED STATES PATENT OFFICE.

JOHN RUSSELL ANTHONY, OF SHERMAN CITY, KANSAS.

FERTILIZER-DISTRIBUTER.

SPECIFICATION forming part of Letters Patent No. 348,507, dated August 31, 1886.

Application filed May 6, 1886. Serial No. 201,355. (No model.)

*To all whom it may concern:*

Be it known that I, JOHN RUSSELL ANTHONY, a citizen of the United States of America, residing at Sherman City, in the county of Cherokee and State of Kansas, have invented certain new and useful Improvements in Fertilizer-Distributers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in fertilizer-distributers; and it consists in the construction and combination of the parts, as will be hereinafter fully set forth, and specifically pointed out in the claims.

The object of my invention is to provide a fertilizer-distributer which can be attached to a vehicle of ordinary construction, so as to distribute the manure broadcast upon the ground or in rows, as may be desired, the same being designed as an improvement on patent dated May 29, 1883, and reissued April 6, 1886.

In the accompanying drawings, which illustrate my invention, Figure 1 is a side elevation of a vehicle, showing my improvement attached thereto. Fig. 2 is a top view or plan of my invention. Fig. 3 is a longitudinal sectional view taken through the line *x x* of Fig. 2. Fig. 4 is a side view, partly in section, said section being taken through the line *y y* of Fig. 2. Fig. 5 is a similar section taken through the line *z z* of Fig. 2. Fig. 6 is a detail perspective view of the sprocket-wheel attached to the main shaft of the fertilizer-distributer. Fig. 7 is an end view of the adjustable board that slides within the wagon-body for conveying the manure therefrom to the fertilizer-distributer. Fig. 8 is a detail perspective view of a hinged or pivoted board for adjusting the feed-opening. Fig. 9 is a detail perspective view of one of the attachments for dropping the fertilizer in a row, and Fig. 10 is an end view showing such attachment applied to the fertilizer-distributer.

A refers to the body of the vehicle, which may be of any ordinary construction, said body being provided with means for attaching side and end boards thereto, so as to increase the capacity of the body. This wagon-body is provided at its rear end between its guide-bars with a transverse arched bar, *a*, which will serve to brace the ends of the side bars, and will at the same time permit the fertilizer to be fed from the wagon-body under the same.

The wagon-body A is preferably provided with a brake-lever, A', which may be of ordinary construction, and in practice the same is disconnected from the brake-bars and a rod, *b*, attached thereto, so as to engage with a bell-crank lever for throwing the fertilizer-distributing mechanism out of engagement with the prime motor, which is in this case one of the rear wheels of the wagon. When the wagon is not provided with a brake-lever, A', an equivalent device is provided, which will serve every purpose therefor.

E refers to a sprocket-wheel, which is detachably connected to one of the rear wheels of the vehicle, adjacent to the hub thereof, said sprocket-wheel being connected to the fertilizer-distributing mechanism by a chain, F, which chain passes over a sprocket-wheel, *c*, which is loosely mounted on the shaft B, said sprocket-wheel being held near the outer end of said shaft by a spiral spring, *c'*, which bears against the inner face of the same. The outer face of this sprocket-wheel *c* is provided with a transverse notch or recess, *c''*, which engages with a pin, *b'*, secured to the shaft B. The inner side of the sprocket-wheel *c* is provided with a grooved collar, within which groove lies the bifurcated end of a bell-crank lever, *d*, said bell-crank lever being pivotally attached to a supporting-bracket, *d'*, which projects from the side of the frame which carries the fertilizer-distributing mechanism. To the other end of this bell-crank lever the bar *b* is attached. By this means it will be readily observed that when the brake-lever is moved forward the sprocket-wheel *c* will be thrown out of engagement with the shaft B, and the vehicle may be moved without operating the fertilizer-distributing mechanism.

C and C' refer to the side pieces of the fertilizer-distributer, to which are rigidly attached cross-boards D and D', the upper portions of said cross-boards being on a line, when the attachment is secured to the wagon-body, with the bottom boards thereof. The cross-board D' is provided with angle-bars $e\ e$, which are rigidly attached to the front vertical sides thereof, and are provided with perforations, through which bolts may be passed for attaching the same to the bottom boards of the wagon-body. The upper edges of the side boards C and C' are each provided with straps $e'$, which are adjustably attached thereto, and extend over the vertical front edges of the side pieces C and C', where they are provided with perforations, preferably slotted, through which a transverse rod, $e''$, passes, for connecting said bars to the wagon-body. By the means hereinbefore described the fertilizer-distributing attachment is securely as well as detachably connected to the end of the wagon-body. The shaft B is journaled in the side pieces C and C', and carries at the right-hand side of the fertilizer-distributing attachment, or adjacent to the side board C, in addition to the sprocket-wheel and its attachments, as hereinbefore described, the cog-wheel G, which meshes with a pinion, $g$, attached to the stub-shaft, journaled between the side piece C and the frame $c^4$, which sprocket-wheel is rigidly attached to its shaft and to a gear-wheel, G', which meshes with a small pinion, $g'$, attached to the end of a shaft which carries a toothed roller, H, which is caused to rotate rapidly in the direction indicated by the arrow in Fig. 3, as the wagon is moved forward. The shaft B is provided between the side boards with a corrugated roller, B'. The opposite end of the shaft B, which carries the corrugated roller B', is provided at its left-hand end, adjacent to the side boards C', with a pinion, $h$, which meshes with a cog-wheel, H, having rigidly attached thereto a pinion, $h'$, which meshes with a cog-wheel, H', the adjacent cog-wheel H'' meshing with a pinion, $h''$, thus communicating to the shaft I a very slow rotary motion in the direction indicated by the arrow in Fig. 3. This cog-wheel H'' and the shaft I carry a ratchet-wheel, $i'$, a gravity-pawl attached to the side piece C', engaging therewith, thus preventing a back movement of said shaft. The transverse board D is provided near its upper edge with an angular transverse piece, J, which projects adjacent to the roller B', and on the opposite side of said roller the transverse board D' has hinged to its upper edge an adjustable board, J', which is provided with a spring, $j$, to which is attached a set-screw, $j'$, for adjusting the inclination of said boards, and at the same time permitting said board having a slight spring movement to and from the roller, so that substances which have not been disintegrated may pass through the opening between the roller and said spring-board without clogging the apparatus.

K refers to an adjustable transverse board, which is employed in connection with the device hereinbefore described for moving the fertilizing material in the wagon-body toward the distributer attached at the rear end thereof, said board being preferably made up of two sections, K' and K², said sections being secured to each other, so that they can be adjusted laterally to suit vehicles of different widths.

The board K' has attached thereto forwardly-projecting braces $k$, which are provided on their under sides with rollers $k'$, which bear upon the bottom boards of the wagon-body, and the vertical side pieces $l\ l$ are provided with hooks $l'$, with which the flexible connection L engage, the opposite end of said flexible connection being attached to the roller I.

The side pieces C and C', on their inner sides, are provided with inclined slots $m$, within which will lie an adjustable transverse board, M, which carries at its lower end an angular guard-plate, $n$, which will bear upon the cords L, so as to remove any fertilizing material which may adhere thereto. The board M also serves as a guard to prevent the fertilizing material which is disintegrated or separated by the toothed roller H being thrown from the fertilizing attachment.

The apparatus hereinbefore described is especially adapted for distributing fertilizing substances broadcast upon the ground, and when it is desired that said fertilizing material should be distributed in rows I attach to the receptacle containing the operating mechanism inclined guide-pieces O O, which are provided with hooks $o\ o$, which engage with eyes $o'$, attached to the boards D and D', these pieces O O being so attached that they will provide jointly a single opening through which fertilizing material will pass.

The operation of my invention is as follows: Before loading the wagon the feeding-board K is first brought to the front end of the wagon-body, the cords L L being attached thereto, so as to connect the same with the roller or shaft I. As the wagon is moved forward or across the field, the feeding-board K will be moved slowly toward the rear end of the wagon, and will bring the fertilizing material in contact with the toothed roller H, which moves at a very high rate of speed, said roller taking the fertilizing material from the wagon-body and delivering it in a comminuted condition upon the feed-roller B', which is corrugated longitudinally, and serves to feed the same evenly upon the ground.

The device hereinbefore described is very simple in construction and effective in operation, and besides possessing the advantages hereinbefore set forth, also possesses the advantage of having the gearing and the bearings therefor all located where the fertilizing material cannot come in contact therewith so as to clog or impede the operation of the parts.

Each apparatus is provided with several sprocket-wheels similar in construction to those shown in Fig. 6, but of different diameters, so that the rotation of the parts may be varied in accordance with the condition of the fertilizing material or manure which it is desired to spread upon the ground.

The device hereinbefore described is adapted to be placed upon wagon-bodies of different widths, the adjusting features not being shown in the drawings, as they are fully shown in the patent hereinbefore referred to, and upon which this is designed as an improvement.

The invention herein set forth may be applied to carts as well as four-wheeled vehicles.

I claim—

1. In a fertilizer-distributer, a receptacle consisting of side pieces C C', with transverse boards D D', adapted to be removably secured to a wagon-body, and provided with a feed-roller, which is geared directly to one of the wheels of the vehicle, a roller adapted to be driven therefrom at a high rate of speed, and a slowly-rotating roller, I, connected to the follower K by flexible connections L L, substantially as shown, and for the purpose set forth.

2. In combination with a fertilizer-distributer constructed substantially as described, a follower, K, consisting of two sections, which are adjustable laterally upon each other, substantially as shown, and for the purpose set forth.

3. In combination with a fertilizer-distributer, consisting of side pieces C C', transverse boards D D', means, as shown, for attaching to a wagon-body, said frame supporting a longitudinal grooved feeding-roller, B', and a rapidly-rotating toothed shaft, H, located above the plane of the wagon-body, and a slowly-rotating shaft, I, carrying flexible connections attached to a transverse follower, K, located within the wagon-body, the parts being combined and organized substantially as shown.

4. In a fertilizer-distributer, the combination of side pieces C and C', carrying at their lower ends cross-boards D and D', said cross-boards having attached thereto an angular transverse piece, J, and an adjustable board, J', a toothed shaft, H, transverse board M, having an angular guard-plate, $n$, attached thereto, and roller I, the parts being combined and organized substantially as shown, and for the purpose set forth.

In testimony whereof I affix my signature in presence of two witnesses.

JOHN RUSSELL ANTHONY.

Witnesses:
JOHN BEEMAN,
CHARLES H. NICHOLS.